S. C. ADAMS.
NUT LOCK.

No. 91,197. Patented June 15, 1869.

Witnesses.
R. T. Campbell
J. W. Campbell

Inventor:
S. C. Adams
by
Mason, Fenwick & Lawrence

United States Patent Office.

SAMUEL C. ADAMS, OF BUFFALO, NEW YORK.

Letters Patent No. 91,197, dated June 15, 1869.

---

IMPROVEMENT IN NUT-LOCK.

---

The Schedule referred to in these Letters Patent and making part of the same.

---

*To all whom it may concern:*

Be it known that I, SAMUEL C. ADAMS, of Buffalo, in the county of Erie, and State of New York, have invented a new and improved Fastening for the Nuts of Railroad-Bolts; and I do hereby declare that the following is a full, clear, and exact description thereof, reference being had to the accompanying drawings, making part of this specification, in which—

Similar letters of reference indicate corresponding parts in the several figures.

The object of this invention is to improve locking-devices for the nuts of railroad-rail bolts, so that the improved fastenings or locks are applicable to the rails, fish-bars, bolts, and nuts, which are in common use, without requiring any change whatever in their construction.

I am aware that A. V. B. Orr obtained Letters Patent of the United States, numbered 75,643, in the schedule of which he describes a circular washer, which is slit so as to present a locking-pawl to shoulders which are formed on that surface of the nut lying next this washer.

This circular washer is also constructed with a lip, which is driven into a recess formed in the face of the splicing-bar.

While this washer may serve to lock a nut on its bolt, and while this nut may be readily set up tightly to its place, there is no convenient method shown for readily removing the nut, and it is probable that A. V. B. Orr intended the washer should be broken by forcibly wrenching it from its place in the act of starting the nut upon its screw-bolt, and thereby rendering the washer useless.

It is also necessary, in this fastening of A. V. B. Orr, to form a recess in the outer side of the splicing-bar, in proper positions to receive the lip on the washer, for the purpose of preventing it from turning, and thus allowing the nut to work loose.

I am also aware that radially-corrugated washers have been used with correspondingly-corrugated nuts for locking the nuts; and I am also aware that malleable plates, with their corners or edges turned up against nuts, to fasten them, have been used.

I do not, therefore, claim as my invention the contrivances above referred to.

To enable others skilled in the art to understand my invention, I will describe its construction and operation.

In the accompanying drawings—

A A represent portions of the ends of two rail-sections, which are secured together by means of fish-bars B B, bolts D D, and nuts $g\,g$, which parts may be constructed in the usual well-known or most approved manner.

The nuts $g$ may be hexagonal, rectangular, or of any other form, and between these nuts and the outer surfaces of the fish-bar B, on one side of the rail, rectangular plates C are interposed, which are made of spring-metal.

Each plate C is made of such size vertically that its upper edge will abut, at $a$, against the bottom side of the lip of the rail, and its lower edge will abut against the upper side of the rail-base, thus preventing the plate from turning or working loose when pressed against the face of the fish-bar by its nut.

Each plate is made of such width, with reference to the nut to be used in conjunction with it, that one side of this plate will be exposed beyond one edge of its nut.

Each plate is perforated, so that it will slip freely on and off its bolt, D, and each plate has a slit cut into it a suitable distance to form a strong spring-pawl, $b$, which will curl up slightly in the act of cutting the slit $c$ with shears.

Figure 1:
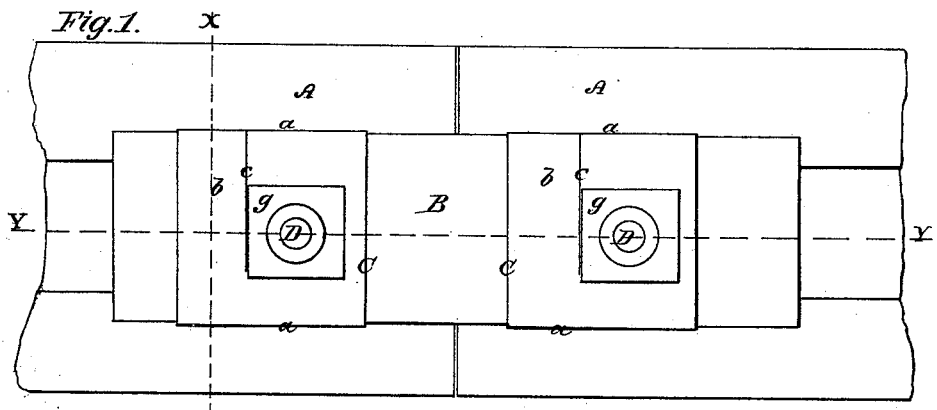
Figure 1 is a side elevation of portions of rail-sections secured together by fish-bars and bolts, and having my improved nut-locks applied to them.
Figure 2:
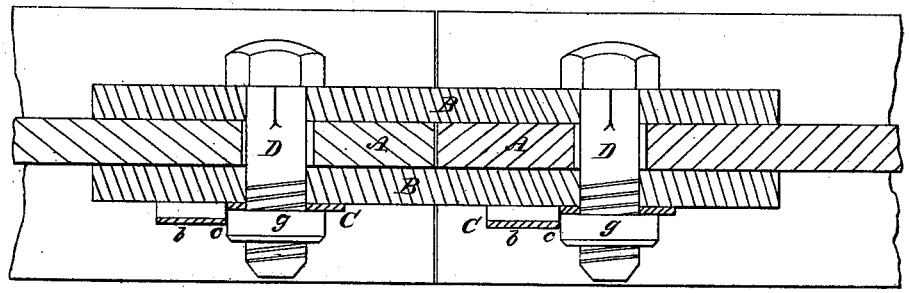
Figure 2 is a section through fig. 1, taken in the horizontal plane indicated by red line Y Y.

The slit $c$ should be made at such distance from the centre of the hole through the plate C, with reference to the width of the nut $g$, that when this nut is set up tightly, as represented in fig. 1, the edge of the pawl or outward-bent portion $b$ will abut against or lie very close to the edge of the nut in line with it, as shown in figs. 1 and 2.

Figure 3:
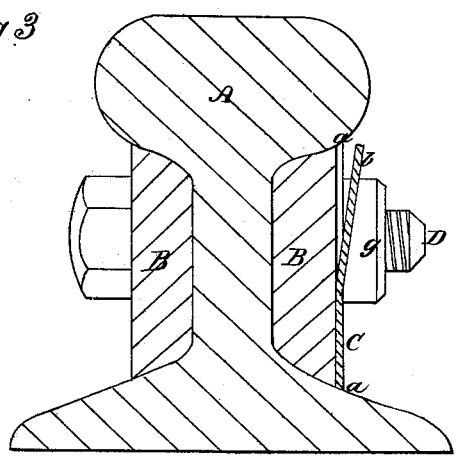
Figure 3 is a cross-section through the rail, taken in the vertical plane indicated by line $x\,x$, fig. 1.

It will be seen, from the above description, that the pawl $b$ will not interfere with the screwing up of the nut upon its bolt, for as the corners of the nut pass around, they will press the pawl flatly against the fish-bar, and when the nut has been set up tight, and its edge lying next the pawl brought in line with the slit $c$, the pawl will spring out, as shown in figs. 2 and 3, and afford an abutment for the nut, which will prevent it from turning backward or unscrewing.

To allow a nut thus fastened to be unscrewed, it is only necessary to press the pawl against the surface of the fish-bar in the plane of the body of the plate C, which might be done with the wrench used to turn the nut.

Having described my invention,

What I claim as a new and improved article of manufacture, is—

The spring-metal plate C, slitted at $c$, and sprung up at $b$, and perforated to allow the bolt D to pass through it, when said plate constitutes in itself a stop-pawl, and the stop-pawl $b$ yields to the pressure of the nut at the time the nut is screwed upon the bolt D, and afterward springs up outside of the nut, and prevents it from turning, all in the manner herein described and shown.

SAMUEL C. ADAMS.

Witnesses:
R. T. CAMPBELL,
E. W. ANDERSON.